United States Patent
Etschmaier et al.

(10) Patent No.: US 11,885,726 B2
(45) Date of Patent: Jan. 30, 2024

(54) PARTICULATE MATTER SENSOR

(71) Applicant: ams AG, Premstaetten (AT)

(72) Inventors: Harald Etschmaier, Eindhoven (NL); Bassam Hallal, Eindhoven (NL); Elisa Parola, Eindhoven (NL); Georg Roehrer, Eindhoven (NL)

(73) Assignee: AMS AG, Premstaetten (AT)

( * ) Notice: Subject to any disclaimer, the term of this patent is extended or adjusted under 35 U.S.C. 154(b) by 342 days.

(21) Appl. No.: 17/269,889

(22) PCT Filed: Dec. 13, 2018

(86) PCT No.: PCT/EP2018/084752
§ 371 (c)(1),
(2) Date: Feb. 19, 2021

(87) PCT Pub. No.: WO2020/038593
PCT Pub. Date: Feb. 27, 2020

(65) Prior Publication Data
US 2021/0318220 A1    Oct. 14, 2021

Related U.S. Application Data

(60) Provisional application No. 62/720,492, filed on Aug. 21, 2018.

(51) Int. Cl.
*G01N 15/14*      (2006.01)
*G01N 15/02*      (2006.01)

(52) U.S. Cl.
CPC . *G01N 15/0211* (2013.01); *G01N 2015/0238* (2013.01)

(58) Field of Classification Search
CPC ................... G01N 15/0211; G01N 2015/0238
See application file for complete search history.

(56) References Cited

U.S. PATENT DOCUMENTS

2010/0050879 A1    3/2010    Knox
2016/0025628 A1    1/2016    Kim et al.
(Continued)

FOREIGN PATENT DOCUMENTS

EP        3214425 A1    9/2017
EP        3258241 A2    12/2017
WO    2016105555 A1    6/2016

OTHER PUBLICATIONS

International Written Opinion for Application No. PCT/EP2018/084752 dated May 16, 2019.

*Primary Examiner* — Rebecca C Bryant
(74) *Attorney, Agent, or Firm* — TAROLLI, SUNDHEIM, COVELL & TUMMINO L.L.P.

(57) ABSTRACT

A particulate matter sensor module includes a light source and a light detector mounted on a substrate. A housing is attached to the substrate and includes first and second sections attached to one another in a stack over the substrate such that the first section is disposed between the substrate and the second section. The first and second sections, in combination, define a light reflection chamber, a fluid flow conduit, a particle-light interaction chamber, and a light trap chamber. The first section has a first aperture through which light emitted by the light source can pass to a reflective surface within the light reflection chamber. The reflective surface is configured to reflect the light toward the particle-light interaction chamber where the light can interact with particles in a fluid flowing in the fluid flow conduit. The first section has a second aperture through which light scattered in the particle-light interaction chamber as a result of interaction with one or more of the particles can pass for sensing by the detector. The fluid flow conduit includes a fluid inlet portion having an end coupled directly to the particle-light interaction chamber.

16 Claims, 9 Drawing Sheets

(56) References Cited

U.S. PATENT DOCUMENTS

2017/0184447 A1\* 6/2017 Matsunami ............ G01N 21/53
2018/0217044 A1   8/2018 Yang et al.

\* cited by examiner

PARTICULATE MATTER SENSOR

RELATED APPLICATIONS

The present invention is a U.S. National Stage under 35 USC 371 patent application, claiming priority to Serial No. PCT/EP2018/084752, filed on 13 Dec. 2018; which claims priority of US Provisional Application Serial Number 62/720492, filed on 21 Aug. 2018, the entirety of both of which are incorporated herein by reference.

CROSS-REFERENCE TO RELATED APPLICATION(S)

This application claims the benefit of priority of U.S. Provisional Patent Application No. 62/720,492, filed on Aug. 21, 2018, the entire contents of which are incorporated herein by reference.
This application incorporates by reference the following applications: U.S. Provisional Patent Application No. 62/599,138, filed on Dec. 15, 2017; U.S. Provisional Patent Application No. 62/599,156, filed on Dec. 15, 2017; and U.S. Provisional Patent Application No. 62/599,168, filed on Dec. 15, 2017.

FIELD OF THE DISCLOSURE

The present disclosure relates to particulate matter sensors.

BACKGROUND

Airborne particulate matter can be generated, for example, by different forms of combustion, chemical processes, or mechanical wear. The size of the particles varies over a wide range, with some particles settling quickly in still air, whereas smaller particles may remain suspended for longer periods of time. Exposure to particulate matter can be harmful to human health. Further, some particulates act as abrasives or contaminates, and can interfere with the performance of equipment.

Some techniques for measuring the presence, amount and/or size of particulate matter in the air rely on optical techniques in which particles are illuminated with an optical signal and light scattered by the particles is detected.

SUMMARY

The present disclosure describes particulate matter sensor modules that operate based on sensing light scattered by the particulate matter. Compact particulate matter sensor modules often need to be capable of analyzing all or at least most of the pumped fluid; otherwise, the available particle number to be counted and/or the particle size to be classified may be too small to determine within a reasonable measurement time. The modules describes in this disclosure can, in some implementations, achieve such desirable results by focusing the fluid to be measured into a small region where the interaction with the light takes place.

In one aspect, for example, a particulate matter sensor module includes a light source and a light detector mounted on a substrate. A housing is attached to the substrate and includes first and second sections attached to one another in a stack over the substrate such that the first section is disposed between the substrate and the second section. The first and second sections, in combination, define a light reflection chamber, a fluid flow conduit, a particle-light interaction chamber, and a light trap chamber. The first section has a first aperture through which light emitted by the light source can pass to a reflective surface within the light reflection chamber. The reflective surface is configured to reflect the light toward the particle-light interaction chamber where the light can interact with particles in a fluid flowing in the fluid flow conduit. The first section has a second aperture through which light scattered in the particle-light interaction chamber as a result of interaction with one or more of the particles can pass for sensing by the detector. The fluid flow conduit includes a fluid inlet portion having an end coupled directly to the particle-light interaction chamber.

Some implementations include one or more of the following features. For example, in some instances, the particle-light interaction chamber has a cross-section that widens along an axis parallel to a light beam path between the reflective surface and the light trap chamber. The inner walls of the particle-light interaction chamber can, for example, be tapered. In some cases, the cross-section widens in a direction toward the light trap chamber, whereas in other cases, the cross-section widens in a direction toward the reflective surface. Further, in some implementations, the particle-light interaction chamber has tapered inner walls that widen in a direction toward the detector.

In some implementations, the end of the fluid inlet portion is coupled directly to one of the tapered inner walls.

In some instances, the reflective surface is a surface of the second section of the housing, whereas in other instances, the reflective surface is a surface of the first section of the housing. The reflective surface can be, for example, a surface of a component that is disposed on a surface of the first section of the housing.

In some implementations, each of the first and second sections of the housing is composed of an injection molded material. Each of the first and second sections of the housing can be composed, for example, of plastic material.

The first and second sections, in combination, also can define a partition between the light reflection chamber and the particle-light interaction chamber, wherein the partition has an aperture through which light reflected by the reflective surface can pass. In some implementations, the partition includes a first wall projecting from the first section of the housing toward the second section of the housing, and a second wall projecting from the second section of the housing toward the first section of the housing. The second wall can be attached to the first section of the housing by adhesive. Each of the first and second walls can have a respective opening, wherein overlapping portions of the openings define the aperture through which the light reflected by the reflective surface can pass. In some cases, the first wall is closer to the light reflection chamber than is the second wall. The first wall can be disposed so as to block light reflected by the reflective surface from passing through the adhesive at locations where the second wall is attached to the first section of the housing.

In some cases, inner surfaces of the first and second sections of the housing have a coating composed of a low reflectance material. The module also can include an adhesive that binds together the first and second sections of the housing, wherein most of the adhesive is not visible from inside the light trap chamber.

In some implementations, the module includes a waveguide to guide the scattered light toward the light detector. Likewise, in some cases, the module includes a second light detector mounted on the substrate and operable to monitor a light power emitted from the light source.

The disclosure also describes a mobile computing device (e.g., a smartphone) that includes a particulate matter sensor system including a particulate matter sensor module, an application executable on the mobile computing device and operable to conduct air quality testing, and a display screen operable to display a test result of the application.

The disclosure further describes a method of manufacturing a particulate matter sensor module. The method includes attaching a first section of a housing to a substrate on which are mounted a light source and a light detector, and attaching a second section of the housing to the first section, such that the first section is disposed between the substrate and the second section. The first section has a first aperture through which light emitted by the light source can pass. The first and second sections, in combination, define a light reflection chamber, a fluid flow conduit, a particle-light interaction chamber, and a light trap chamber.

Some implementations include one or more of the following advantages. For example, by forming the fluid inlet portion of the fluid flow conduit and the particle-light interaction chamber as a single part, the distance between them need not depend on mechanical alignment tolerances. In addition, the spacing between the fluid inlet portion and the light path can be rather small. By providing the fluid inlet portion of the fluid flow conduit very close to the light path—which is desirable to achieve good focusing of the fluid in the relevant region—the supporting conduit material could, in some cases, shield part of the optical signal. This affect, however, can be reduced by the tapered sidewall(s) in the particle-light interaction chamber (e.g., tapered towards the detector). The tapered shape of the chamber (e.g., tapered along an axis from the reflective surface towards the light trap) can be designed such that, even as the light beam diverges, the light beam will not impinge on the sidewalls of the particle-light interaction chamber, including the fluid inlet portion of the fluid flow conduit.

Other aspects, features and advantages will be readily apparent from the following detailed description, the accompanying drawings, and the claims.

DETAILED DESCRIPTION

Figure 1:
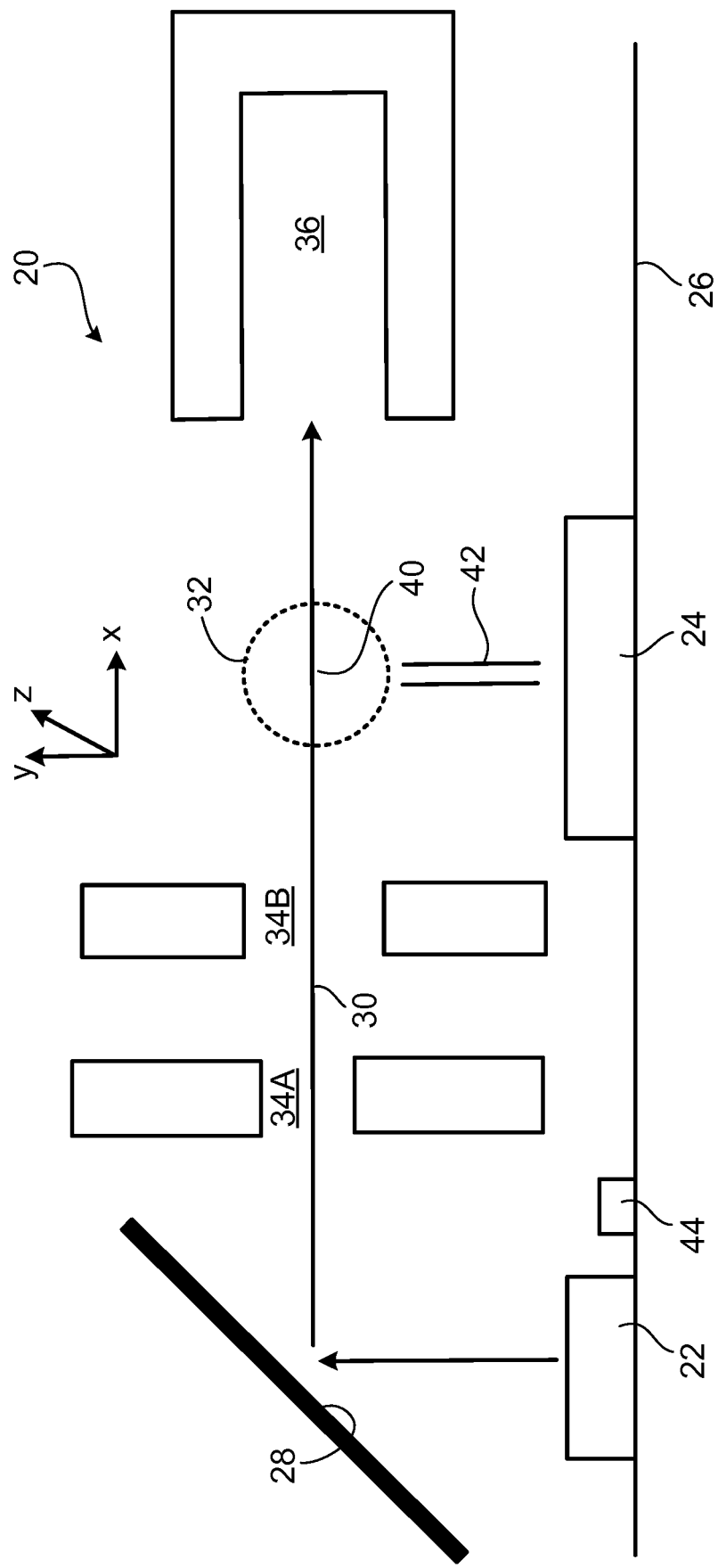
FIG. 1 illustrates a particulate matter sensor module schematically.

As shown in FIG. 1, a particulate matter sensor module 20 includes a light source 22 (e.g., a vertical cavity surface emitting laser (VCSEL)) operable to emit light toward a reflective surface 28, which redirects the emitted light along a path 30 through one or more light apertures 34A, 34B such that the light path 30 passes through a particle-light interaction chamber 40. Fluid (e.g., an aerosol) is pumped through a fluid flow conduit 32, which can be substantially perpendicular to the light path 30. Thus, in the illustrated example, the light path 30 is in the x-direction, and the fluid flow conduit 32 is in the z-direction. As a fluid flows through the conduit 32, the light beam interacts, in the particle-light interaction chamber 40, with particulate matter in the fluid. The interaction scatters some of the light toward a light detector 24 (e.g., a photodiode) operable to detect the scattered light. In some implementations, as shown in FIG. 1, a light pipe or other waveguide 42 can be provided to guide the scattered light toward the light detector 24 and to reduce the effective distance from the particle-light interaction chamber 40 to the detector 24. Light that does not interact with the particular matter continues to travel into a light trap chamber 36 to prevent such light from being reflected back toward the detector 24.

The detector 24 can be implemented, for example, as an optical photosensor that is operable to measure the signal of a single particle. In such instances, the pulse height is proportional to particle size, and the pulse count rate corresponds to the number of detected particles. The concentration can be derived, for example, from the number of detected particles, if the amount of the analyzed volume is known (e.g., air flow rate, measurement time). The mass can be calculated based on an assumed refractive index and density. In other implementations, the detector 24 is implemented as a photometer or nephelometer. The detector 24 can be integrated, for example, into a semiconductor chip that also may include electronics for reading, amplifying and processing the signals. In some cases, the processing circuitry may reside in a separate chip. The light source 22 and detector 24 can be mounted on, and electrically connected to, a substrate 26 (e.g., a printed circuit board).

In some implementations, a second light detector 44 can be mounted on the substrate and can be used to monitor the light power emitted from the light source 22. The second detector 44 can be placed, for example, next to the light source or below an aperture in the light trap chamber 36.

Figure 2:
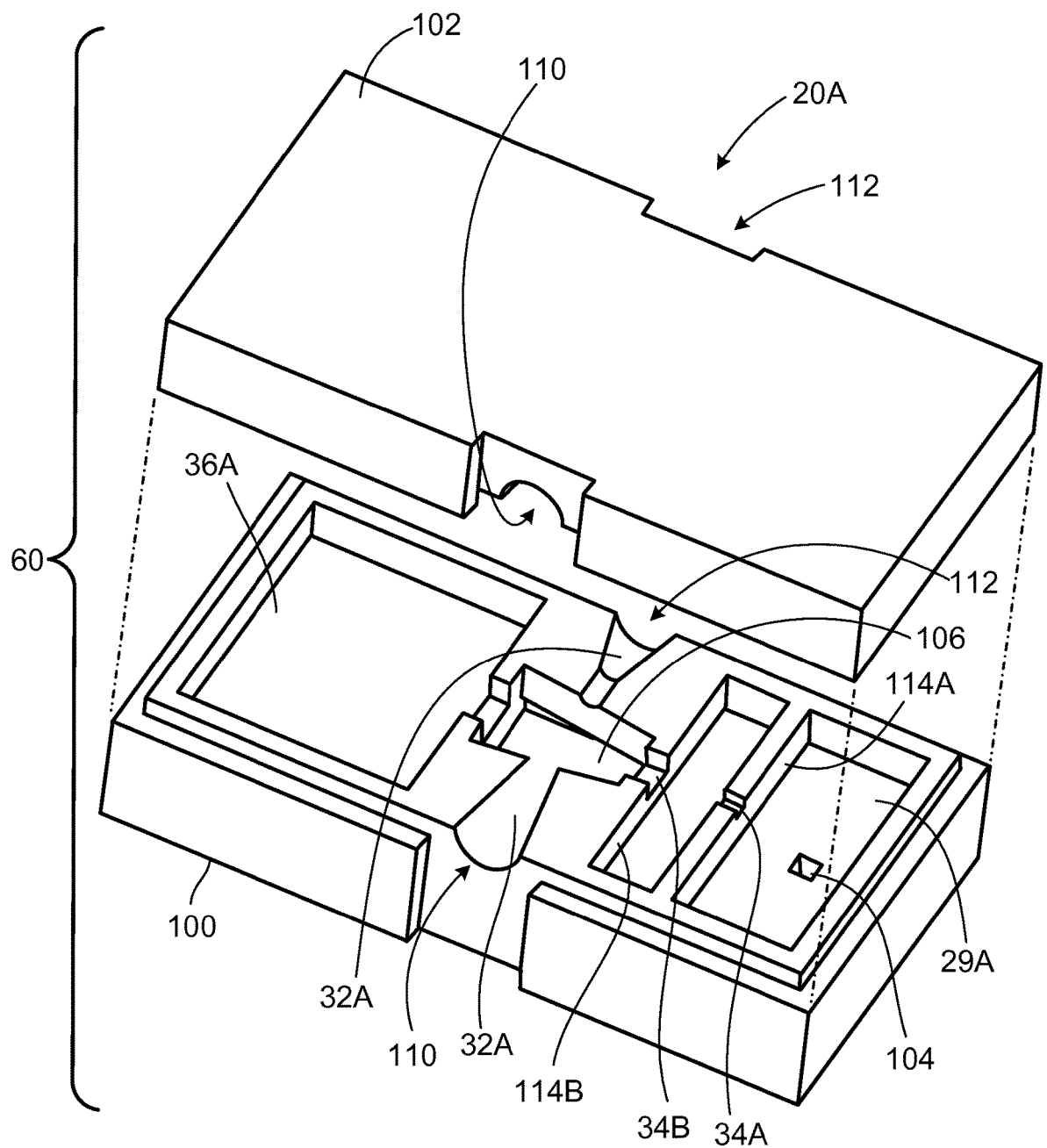
FIG. 2 illustrates an exploded top perspective view of a first example of a housing for the particulate matter sensor module.
Figure 3:
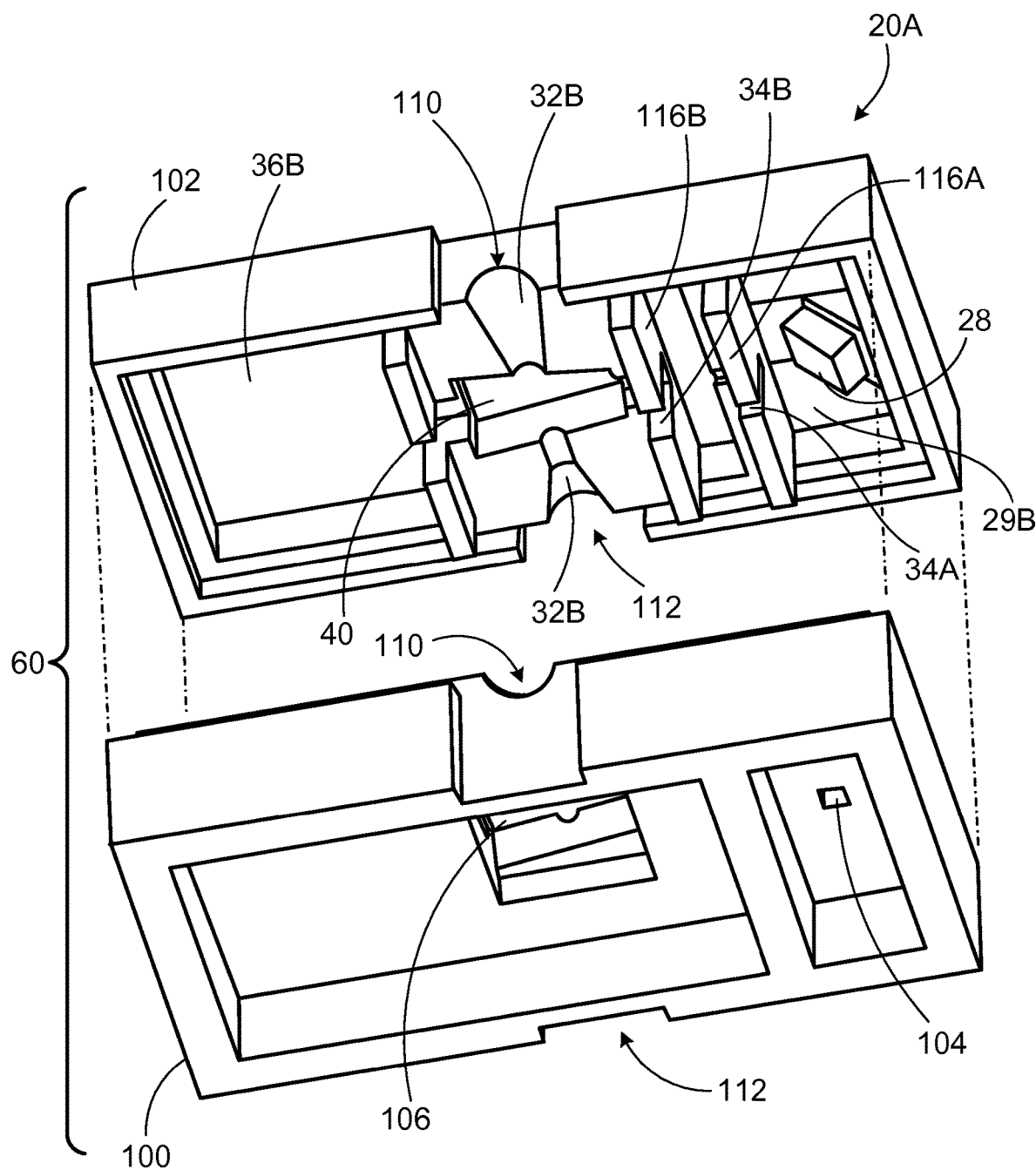
FIG. 3 illustrates an exploded bottom perspective view of the first example of the housing for the particulate matter sensor module.

FIGS. 2 and 3 illustrate various aspects of a particulate matter sensor module 20A according to some implementations. In the illustrated example, the module includes a housing 60, which can be attached over the substrate 26 on which the light source 22 and detector 24 are mounted. The housing 60 has a lower section 100 and an upper section 102, attached to one another, for example, by an adhesive. Each of the lower and upper sections 100, 102 can be composed, for example, of a plastic or resin, and can be formed, for example, by injection molding. The inner surfaces of the first and second sections can be coated, for example, with a black or other low reflectance material so as to reduce optical cross-talk and undesirable reflections. When attached together, the lower and upper sections, in combination, define the light beam path 30, including the apertures 34A, 34B, as well as the fluid flow conduit 32, the particle-light interaction chamber 40 and the light trap chamber 36. In particular, the lower section 100 has a cavity 36A that defines a first (lower) part of the light trap chamber 36, and the upper section 102 has a cavity 36B that defines a corresponding, second (upper) part of the light trap chamber 36. The inner surfaces of the cavities 36A, 36B defining the light trap chamber should be able to absorb most or all of the light entering the light trap chamber. The lower section 100 also has semi-conical indentations 32A that define a first (lower) part of the fluid flow conduit 32, and the upper section 102 has semi-conical indentation 32B that define a second (upper) part of the fluid flow conduit 32.

As further shown in FIGS. 2 and 3, the lower section 100 has a first aperture 104 aligned with the optical axis the light source (not shown in FIGS. 2 and 3) and also aligned with the reflective surface 28. The reflective surface 28 is disposed in a light reflection chamber defined by a cavity 29B in the upper section 102 and a corresponding cavity 29A in the lower section 100 of the housing. Thus, in combination, the lower and upper sections 100, 102 of the housing 60 also define the light reflection chamber. Light emitted by the light source passes through the aperture 104 toward the reflective surface 28, which in the implementation of FIGS. 2 and 3, is in the upper section 102. The reflective surface 28 can be implemented, for example, as a mirror or as a reflective coating on a prism-shaped structure. The reflective surface 28 is oriented so as to redirect the light beam through the apertures 34A, 34B and into the particle-light interaction chamber 40 where the light beam intersects the flow of fluid through the conduit 32 and can interact with particulate matter in the fluid. The lower section 100 also has a second aperture 106 aligned with the optical axis of the light detector 24 (not shown in FIGS. 2 and 3). Light scattered by the particulate matter can pass through the aperture 106 to be sensed by the detector 24.

The fluid flow conduit 32 includes a fluid inlet portion 110 to guide the fluid into the particle-light interaction chamber 40, and a fluid outlet portion 112 to guide the fluid away from the particle-light interaction chamber 40.

As noted above, the axis of the fluid flow conduit 32 (i.e., the direction of fluid flow) is substantially transverse to the light path 30 from the reflective surface 28 to the particle-light interaction chamber 40. Preferably, the end of the inlet portion 110 from which the fluid enters the chamber 40 is coupled directly to the chamber 40 such that the end of the inlet portion 110 is as close as possible to the path of the light beam without interfering with the light beam. Providing the end of the inlet portion 110 very close to the light path can help achieve good focusing of the fluid in the desired region. The inlet portion 110, however, preferably should not extend into the chamber 40 or into the path of the light beam 30. The fluid outlet portion 112 also can have an end coupled directly to the chamber 40. Here too, the outlet portion 112 preferably should not extend into the chamber 40 or into the path of the light beam 30.

As shown in FIG. 3, the particle-light interaction region chamber 40 can be implemented as a tapered structure that has one or more tapered inner walls that widen slightly in the direction of the light trap chamber 36. The tapered shape of the chamber 40 can be designed to increase the likelihood that, even as the light beam diverges as it travels in the direction of the light trap chamber 36, the light beam will not impinge on the sidewalls of the chamber 40, including the fluid inlet portion 110 or the fluid outlet portion 112 of the fluid flow conduit 32. The tapered shape can, in some implementations, allow a more narrow spacing from the inlet portion 110 of the fluid flow conduit 32 to the chamber 40. In the event that a beam-shaping system (e.g., one or more optical lenses) are provided along the light path 30 (e.g., between the reflective surface 28 and the chamber 40) such that the light converges, the walls of the chamber 40 can be designed so as to taper in the reverse direction (i.e., narrow slightly in the direction of the light trap chamber 36).

In some implementations, the inner walls of the particle-light interaction region chamber 40 also can be tapered such that they widen somewhat in the downward direction toward the detector 24. The tapered shape can increase the likelihood that a greater percentage (or even all) of the light scattered as a result of the light-particle interaction will reach the detector 24.

By forming the lower and upper sections 100, 102 of the housing 60, for example, by injection molding, the fluid flow conduit 32 and the particle-light interaction chamber 40 can form a single integral unitary piece such that the distance between them does not depend on mechanical alignment tolerances. Further, in some instances, the overall height of the module can be on the order of just a few millimeters (e.g., 2 mm). Other dimensions may be appropriate for some implementations. Such compact particulate matter sensor modules can help focus the fluid to be measured into a small region where the interaction with the light takes place so all or at least most of the pumped fluid (e.g., aerosol) can be analyzed within a reasonable measurement time.

Figure 4:
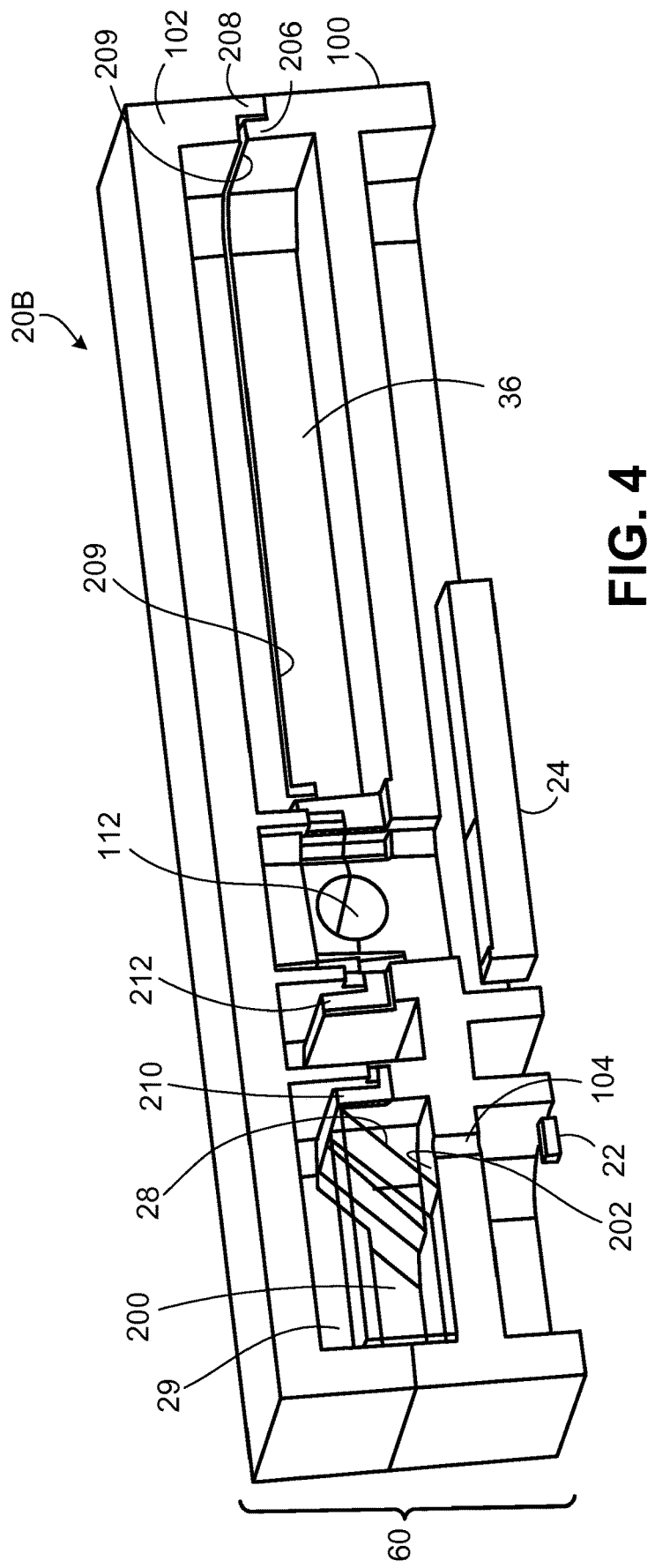
FIG. 4 is a cross-section of another example of a housing for the particulate matter sensor module, looking in the direction of a fluid outlet portion of a fluid flow conduit.

FIG. 4 illustrates another example of a particulate matter sensor module 20B that is similar in many respects to the module 20A described above. However, in the module 20B of FIG. 4, the reflective surface 28 is part of a component 200 that rests on a surface 202 of the lower section 100 of the housing rather than being attached to, or part of, the upper section 102 of the housing as in FIGS. 2 and 3. The arrangement of FIG. 4 can, in some cases, make it easier to align the reflective surface 28 with the light source 22 by using the presence of the aperture 104 in the lower section 100 during the alignment process.

Figure 5:
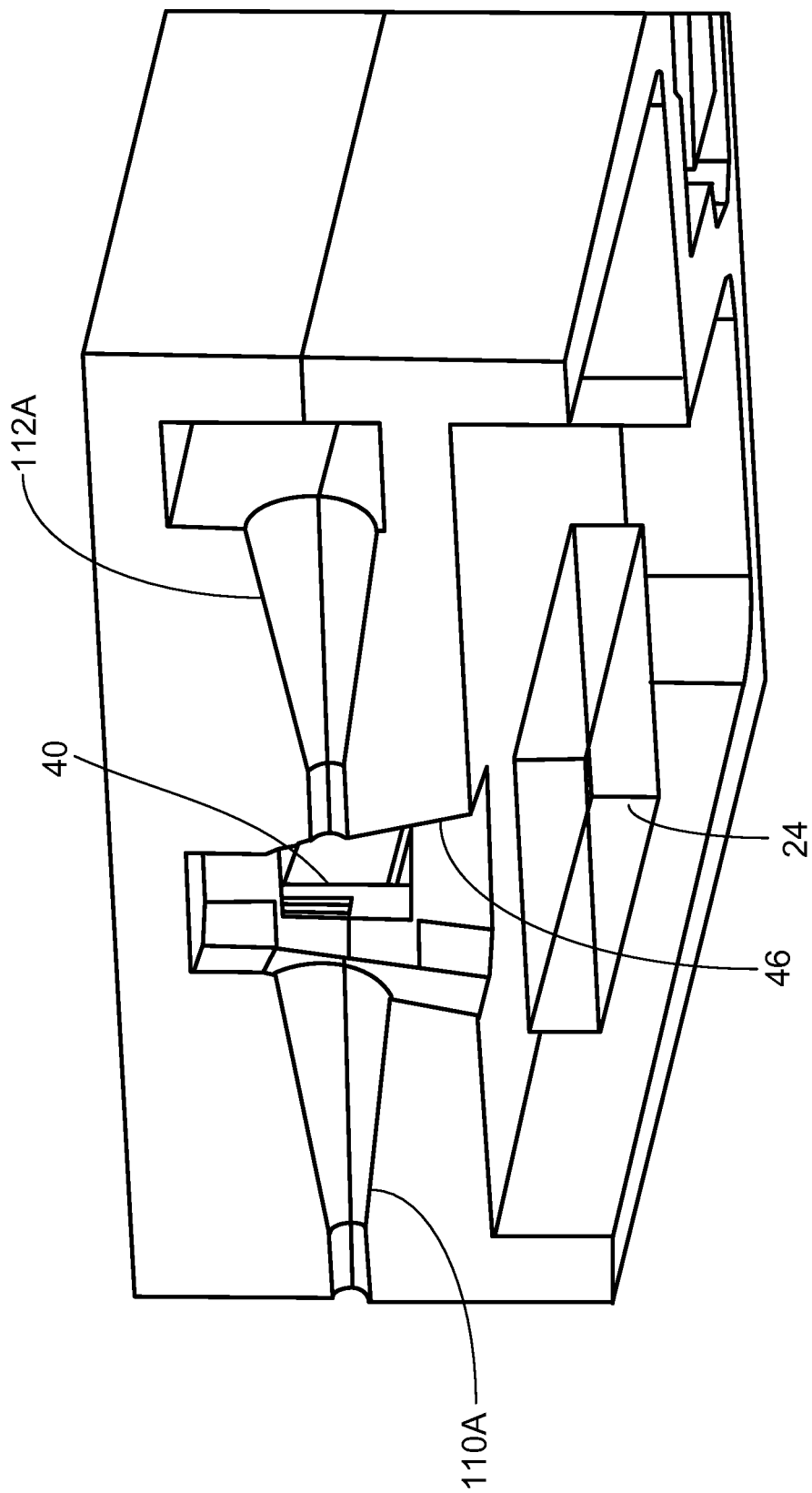
FIG. 5 is a cross-section of the housing of the module of FIG. 4.

FIG. 5 shows a cross-section of FIG. 4 that the fluid inlet portion 112A of the fluid flow conduit 32 narrows (e.g., in a conical shape) in the direction of the particle-light interaction chamber 40. On the other hand, the fluid outlet portion 110A of the fluid flow conduit 32 widens (e.g., in a conical shape) in a direction away from the particle-light interaction chamber 40. The presence of the fluid outlet portion 110A of the fluid flow conduit 32 can be particularly advantageous, for example, when the sensor 20B is operated with a membrane pump to smooth the fluid flow. As further shown in FIG. 5, in addition to tapering the inner walls of the fluid inlet portion 112A and/or fluid outlet portion 110A, the inner walls 46 of the particle-light interaction region chamber 40 also can be tapered such that they widen somewhat in the downward direction toward the detector 24. The tapered shape allows a large percentage or even all of the light scattered to the detector to reach the detector, just as it is the case when the walls have a large distance (e.g., larger than the detector size).

FIG. 4 also illustrate that, in some cases, the lower section 100 can have projecting and recessed alignment features 206 that engage with corresponding projecting and recessed alignment features 208 of the upper section 102. The respective alignment features 206, 208 can facilitate alignment of the two sections 100, 102 of the housing 60 before they are permanently attached to one another (e.g., by adhesive). The alignment features 206, 208 thus can help ensure that the sections 100, 102 of the housing can be mounted together with only a minimal mechanically-defined misalignment. Further, the inner surfaces of the light trap chamber 36 advantageously can be coated with a low reflectance (e.g., black) material. Preferably, the low reflectance material has a reflectance of 1% of less. The glue or other adhesive 209 can be placed, for example, on the highest surface of the second section 102. Hence, much (or most) of the adhesive will not be visible from the inside of the light trap chamber 36, which can enhance the quality and effectiveness of the light trap. Although a few areas of the adhesive close to the aperture at the entrance of the light trap may be visible from inside the light trap chamber, light reflected there typically needs multiple reflections to pass through the aperture and reach the detector.

Figure 6B:
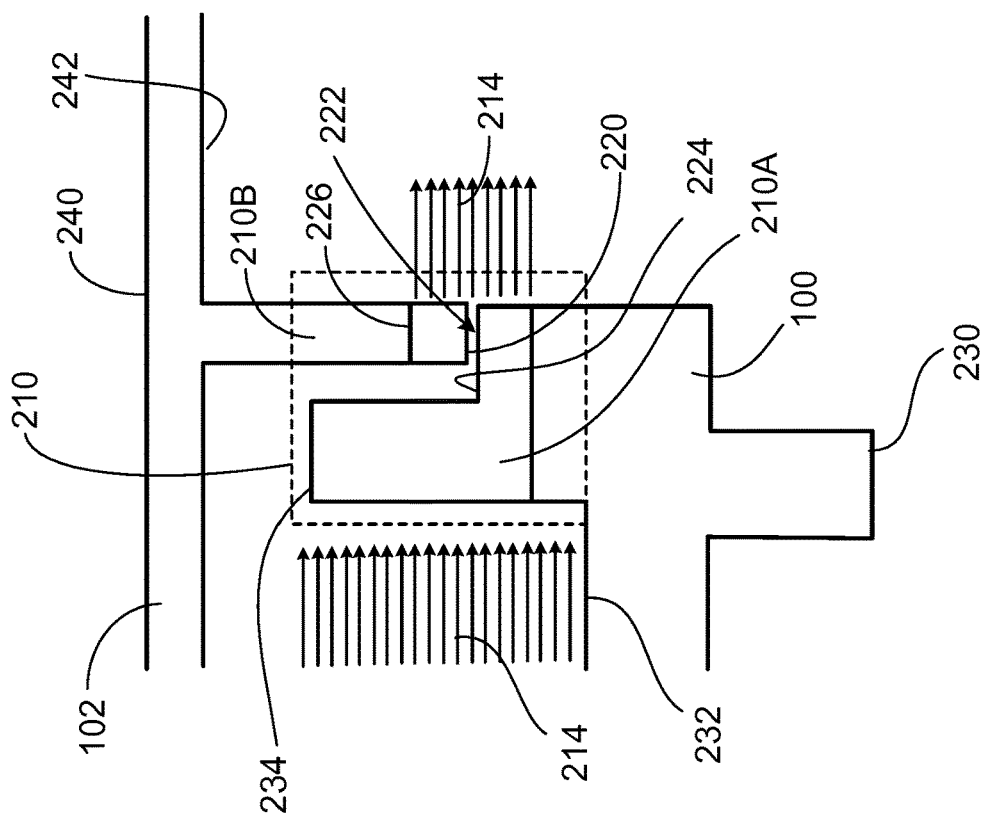
FIG. 6B is a cross-sectional view of FIG. 6A.
Figure 6A:
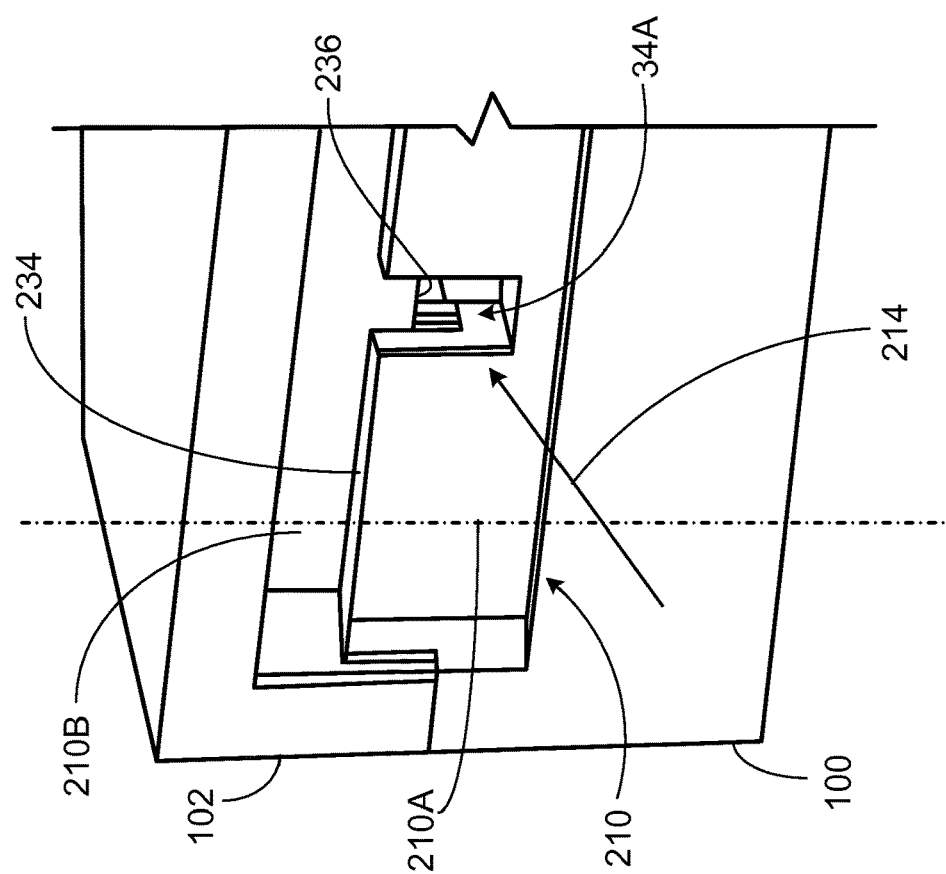
FIG. 6A shows a cross-sectional view of part of a partition containing an aperture for a light path.
Figure 6C:
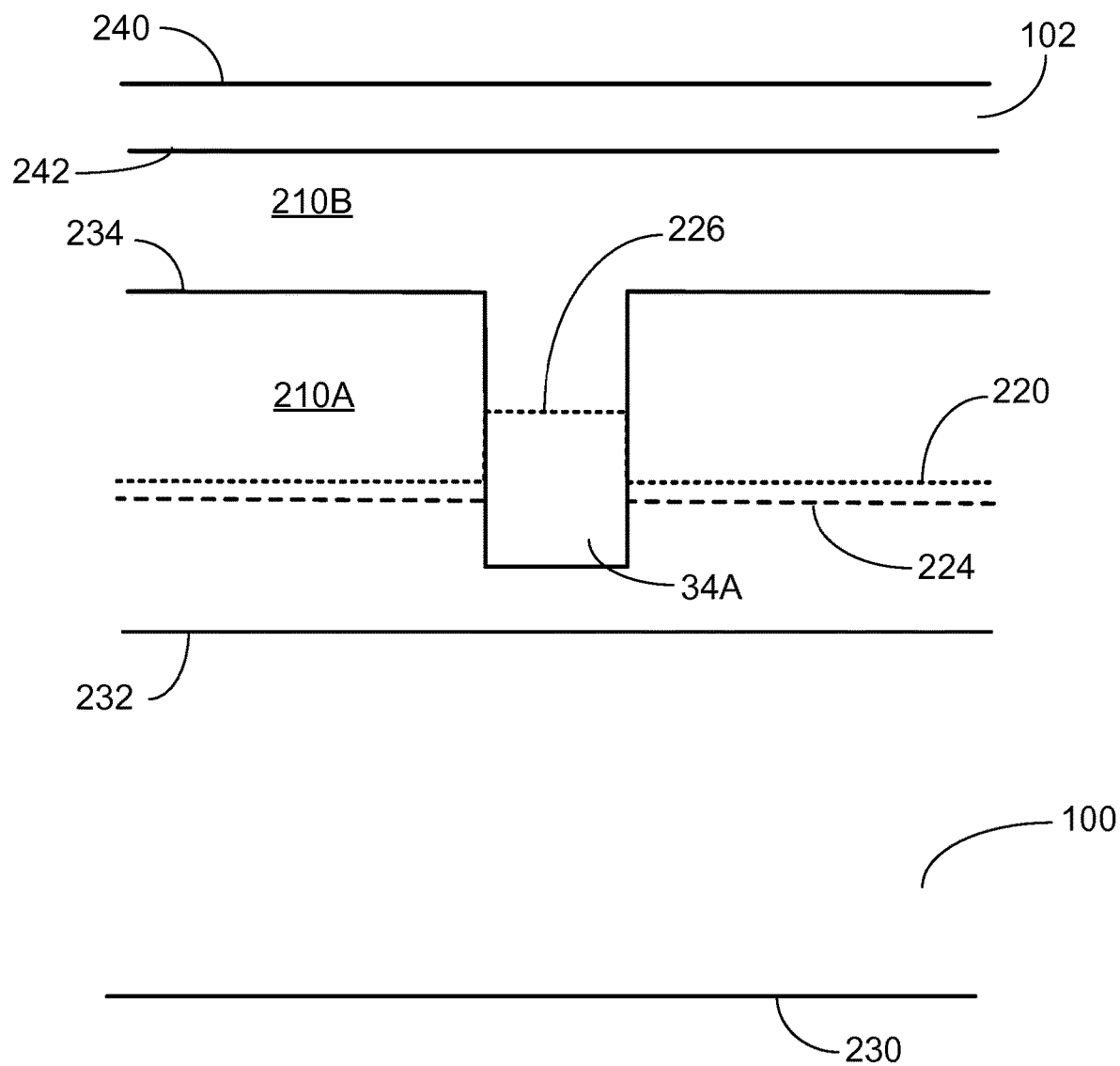
FIG. 6C illustrates the relative positions of various surfaces in FIGS. 6A and 6B.

As described below, a light-tight arrangement can be provided for formation of partitions 210, 212 that contain the apertures 34A, 34B for passage of the light beam. To facilitate understanding, FIG. 6A shows a view (as seen from the direction of the reflective surface 28) of part of the partition 210 in which the aperture 34A is formed. The arrow 214 indicates the direction of travel of the light beam after having been reflected by the reflective surface 28. FIG. 6B illustrates a cross-section view of FIG. 6A in a plane through the optical axis, parallel to the light beam and perpendicular to the aerosol stream. The partition 210 containing the aperture 34A can constitute a double wall, part of which is formed by an upward projection 210A from the lower section 100 of the housing, and part of which is formed by a downward projection 210B from the upper section 102 of the housing. A lower end 220 of the downward projection 210B can be attached, by adhesive 222, to a ledge 224 adjacent the upward projection 210A. The line 226 in FIG. 6B indicates the relative position of the top of the aperture 34A. FIG. 6C illustrates the relative positions of various surfaces of the partition 210 (as seen from the perspective of the light beam traveling toward the walls 210A, 210B). Overlapping portions of openings in the upwardly and downwardly projecting walls 210A, 210B define the aperture 34A. In FIG. 6C, the dashed lines represent surfaces behind the projection 210A. Additional surfaces 230, 232, 234 of the lower section 100, and additional surfaces 240, 242 of the upper section 102 are labeled to facilitate comparison of FIGS. 6A, 6B and 6C.

By using the arrangement of FIGS. 6A through 6C, the upward projection 210A can prevent the light beam from impinging on the adhesive 222 at the boundary where the lower and upper sections 100, 102 of the housing are attached to one another. Thus, even if the adhesive 222 were transparent to the light beam, the light beam would only be able to pass through the aperture 34A in the partition 210. Likewise, even if there were a small vertical gap present between the end 220 of the projection 210B and the ledge 224 (e.g., as result of manufacturing tolerances), the light beam would only be able to pass through the aperture 34A in the partition 210. A similar arrangement can be provided for the partition 212 that contains the second aperture 34B. The features described in connection with FIGS. 6A through 6C also can be incorporated into the implementation of FIGS. 2 and 3.

Figure 7:
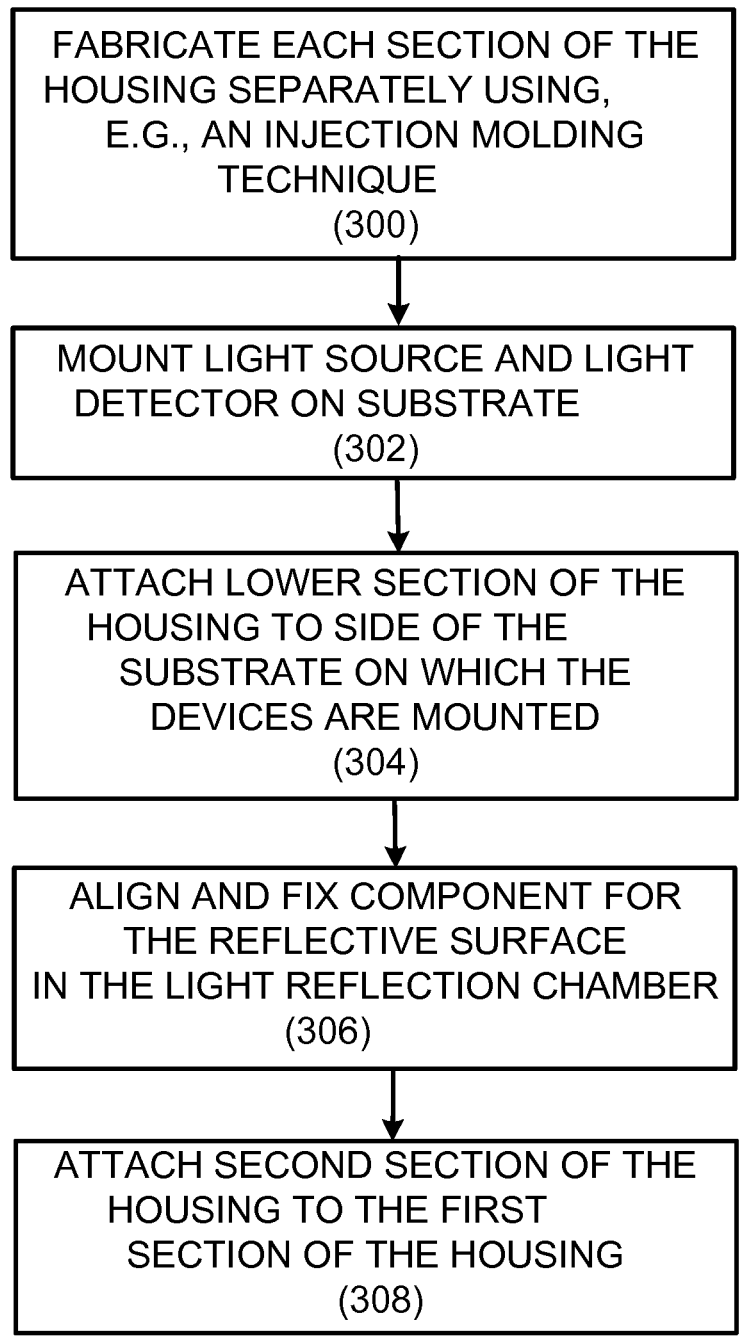
FIG. 7 illustrates an example of a method of manufacturing the particulate matter sensor modules.

As indicated by FIG. 7, to manufacture one of the foregoing modules, 20A or 20B, each section 100, 102 of the housing 60 is fabricated separately, for example, using an injection molding technique (300). The light source 22 and light detector 24 are mounted on a printed circuit board (PCB) or other substrate (302), and the lower section 100 of the housing is attached (e.g., by adhesive) to side of the PCB on which the devices 22, 24 are mounted (304). In some cases, as shown in FIG. 4, a separate component 200 for the reflective surface 28 then is aligned and fixed in the light reflection chamber 29 (306). Next, the second section 102 of the housing 60 is attached (e.g., by adhesive) to the first section 100 of the housing (308). As noted above, the features 206, 208 (FIG. 4) can facilitate alignment of the two housing sections 100, 102.

In some implementations, the foregoing manufacturing method can be performed as part of a wafer-level process. Wafer-level processes allow multiple modules to be fabricated at the same time. In the wafer-level process, multiple light source and light detectors are mounted on a substrate (e.g., PCB) wafer. After attaching the wafers that form the first and second sections of the housing, the stack can be singulated (e.g., by dicing) into separate individual modules such as those described above.

The particulate matter sensor modules described here can be incorporated, for example, into a microfluidic particulate matter sensor system. In some instances, the sensor system may include a microcontroller to control the light source 22, a pump operable to drive fluid air flow through the sensor system, a pump controller operable to control the pump and a processing circuitry to process signals from the light detector 24.

Fabrication of the particulate matter sensors and sensor systems described here is compatible with high-throughput, low-cost manufacturing techniques such as injection molding and microelectronics processing and packaging techniques, enabling rapid and economical manufacturing of these sensors and sensor systems.

Figure 8:
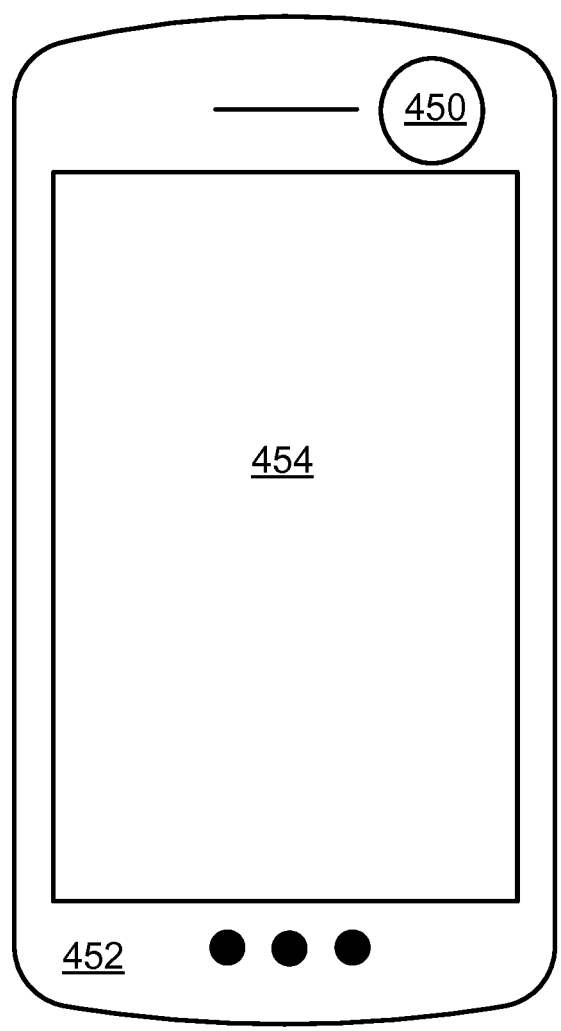
FIG. 8 illustrates an example of a mobile or handheld computing system that includes a particulate matter sensor system.

As shown in FIG. 8, a particulate matter sensor system 450 including a particulate matter sensor module (e.g., module 20A or 20B) can be incorporated into a mobile or handheld computing device 452, such as a smartphone (as shown), a tablet, or a wearable computing device. The particulate matter sensor system 450 can be operable by a user, e.g., under control of an application executing on the mobile computing device 452, to conduct air quality testing. A test result can be displayed on a display screen 454 of the mobile computing device 452, e.g., to provide substantially immediate feedback to the user about the quality of the air in the user's environment.

The particulate matter sensor systems described here can also be incorporated into other devices, such as air purifiers or air conditioning units; or used for other applications such as automotive applications or industrial applications.

Various modifications will be readily apparent and can be made to the foregoing examples. Features described in connection with different embodiments may be incorporated into the same implementation in some cases, and various features described in connection with the foregoing examples may be omitted from some implementations. Thus, other implementations are within the scope of the claims.

What is claimed is:

1. A particulate matter sensor module comprising:
a substrate;
a light source and a light detector mounted on the substrate; and
a housing attached to the substrate and including first and second sections attached to one another in a stack over the substrate such that the first section is disposed between the substrate and the second section, wherein the first and second sections, in combination, define a light reflection chamber, a fluid flow conduit, a particle-light interaction chamber, and a light trap chamber,
the first section having a first aperture through which light emitted by the light source can pass to a reflective surface within the light reflection chamber, the reflective surface being configured to reflect the light toward the particle-light interaction chamber where the light can interact with particles in a fluid flowing in the fluid flow conduit,
the first section having a second aperture through which light scattered in the particle-light interaction chamber as a result of interaction with one or more of the particles can pass for sensing by the detector, wherein the fluid flow conduit includes a fluid inlet portion having an end coupled directly to the particle-light interaction chamber, wherein the particle-light interaction chamber has an input end and an output end, the particle-light interaction chamber having a tapered cross-section that widens along an axis parallel to a light beam path between the reflective surface and the light trap chamber, wherein the tapered cross-section widens continuously from the input end to the output end, in a direction toward the light trap chamber.

2. The module of claim 1, wherein the particle-light interaction chamber has tapered inner walls.

3. The module of claim 1, wherein the particle-light interaction chamber has tapered inner walls that widen in a direction toward the detector.

4. The module of claim 1, wherein the reflective surface is a surface of the second section of the housing; and/or
wherein the reflective surface is a surface of the first section of the housing.

5. The module of claim 1, wherein the reflective surface is a surface of a component that is disposed on a surface of the first section of the housing.

6. The module of claim 1, wherein each of the first and second sections of the housing is composed of an injection molded material.

7. The module of claim 1, wherein the first and second sections, in combination, further define a partition between the light reflection chamber and the particle-light interaction chamber, wherein the partition has an aperture through which light reflected by the reflective surface can pass.

8. The module of claim 7, wherein the partition includes:
a first wall projecting from the first section of the housing toward the second section of the housing; and
a second wall projecting from the second section of the housing toward the first section of the housing, wherein the second wall is attached to the first section of the housing by adhesive;
wherein each of the first and second walls has a respective opening, and wherein overlapping portions of the openings define the aperture through which the light reflected by the reflective surface can pass.

9. The module of claim 8, wherein the first wall is closer to the light reflection chamber than is the second wall.

10. The module of claim 8, wherein the first wall is disposed so as to block light reflected by the reflective surface from passing through the adhesive at locations where the second wall is attached to the first section of the housing.

11. The module of claim 1, wherein inner surfaces of the first and second sections have a coating composed of a low reflectance material and/or a black material.

12. The module of claim 1, further including a waveguide to guide the scattered light toward the light detector.

13. The module of claim 1, further including a second light detector mounted on the substrate and operable to monitor a light power emitted from the light source.

14. A mobile computing device comprising:
a particulate matter sensor system including a particulate matter sensor module according to claim 1;
an application executable on the mobile computing device and operable to conduct air quality testing; and
a display screen operable to display a test result of the application.

15. A method of manufacturing a particulate matter sensor module, the method comprising:
forming a first section of a housing, the first section of the housing comprising an aperture, a first part of a light trap chamber, a first part of a light reflection chamber, a first part of a fluid flow conduit, and a first part of a particle-light interaction chamber;
forming a second section of a housing, the second section of the housing comprising a second part of the light trap chamber, a second part of the light reflection chamber, a second part of the fluid flow conduit, and a second part of the particle-light interaction chamber;
attaching the first section of a housing to a substrate, wherein the substrate has a light source and a light detector mounted thereon, and arranging the first section such that light emitted by the light source can pass through the aperture;
attaching the second section of the housing to the first section, such that the first section is disposed between the substrate and the second section, and such that the first and second sections, in combination, define the light reflection chamber, the fluid flow conduit, the particle-light interaction chamber, and the light trap chamber; and
disposing a reflective surface in the light reflection chamber,
wherein the particle-light interaction chamber has an input end and an output end, the particle-light interaction chamber having a tapered cross-section that widens along an axis parallel to a light beam path between the reflective surface and the light trap chamber, and
wherein the tapered cross-section widens continuously from the input end to the output end, in a direction toward the light trap chamber.

16. The method of claim 15, wherein each of the first and second sections has respective alignment features, the method including:
engaging the alignment features of the first section with the alignment features of the second section; and
subsequently affixing the first and second sections to one another by adhesive.

* * * * *